US009008998B2

(12) United States Patent
Canter

(10) Patent No.: US 9,008,998 B2
(45) Date of Patent: Apr. 14, 2015

(54) SYSTEMS AND METHODS FOR PROCESSING MAPPING AND MODELING DATA

(75) Inventor: Peter Canter, Toronto (CA)

(73) Assignee: Trimble Navigation Limited, Sunnyvale, CA (US)

(*) Notice: Subject to any disclaimer, the term of this patent is extended or adjusted under 35 U.S.C. 154(b) by 1093 days.

(21) Appl. No.: 12/931,524

(22) Filed: Feb. 3, 2011

(65) Prior Publication Data

US 2011/0282622 A1 Nov. 17, 2011

Related U.S. Application Data

(60) Provisional application No. 61/337,549, filed on Feb. 5, 2010.

(51) Int. Cl.
G06F 15/00 (2006.01)
G06K 9/00 (2006.01)

(52) U.S. Cl.
CPC .................................. G06K 9/00691 (2013.01)

(58) Field of Classification Search
USPC ........................................................ 702/150
See application file for complete search history.

(56) References Cited

U.S. PATENT DOCUMENTS

| 5,828,336 | A | * | 10/1998 | Yunck et al. | ............. | 342/357.31 |
|---|---|---|---|---|---|---|
| 5,959,575 | A | | 9/1999 | Abbott | | |
| 6,009,359 | A | | 12/1999 | El-Hakim et al. | | |
| 6,349,249 | B1 | | 2/2002 | Cunningham | | |
| 6,608,913 | B1 | | 8/2003 | Hinton et al. | | |
| 6,711,475 | B2 | | 3/2004 | Murphy | | |
| 6,917,893 | B2 | | 7/2005 | Dietsch et al. | | |
| 7,302,359 | B2 | | 11/2007 | McKitterick | | |
| 7,576,690 | B2 | * | 8/2009 | Vollath | ..................... | 342/357.24 |
| 7,774,158 | B2 | | 8/2010 | Goncalves et al. | | |
| 2004/0168148 | A1 | | 8/2004 | Goncalves et al. | | |
| 2005/0101248 | A1 | * | 5/2005 | Vollath | ......................... | 455/12.1 |
| 2007/0182628 | A1 | * | 8/2007 | Pomerantz et al. | ...... | 342/357.06 |
| 2009/0093959 | A1 | | 4/2009 | Scherzinger et al. | | |
| 2009/0262974 | A1 | | 10/2009 | Lithopoulos | | |

OTHER PUBLICATIONS

International Preliminary Report on Patentability mailed Aug. 16, 2012 in connection with related PCT International Application No. PCT/US2011/000194 (Applicant: Trimble Navigation Limited).
Christopher E. Parrish, et al., Investigating Full-Waveform Lidar Data for Detection and Recongiation of Vertical Objects, ASPRS 2007 Annual Conference, Tampa, Florida May 7-11, 2007.
International Search Report dated Apr. 4, 2011.

* cited by examiner

Primary Examiner — Patrick Assouad
Assistant Examiner — Haidong Zhang
(74) Attorney, Agent, or Firm — Cooper & Dunham LLP

(57) ABSTRACT

A method for post-processing georeferenced mapping data includes providing positioning data indicating a position of a data acquisition system in a defined space at specific moments in time, providing ranging data indicating relative position of objects in the defined space with respect to the data acquisition system at the specific moments in time, performing a smoothing process on the positioning data to determine smoothed best estimate of trajectory (SBET) data for trajectory of the data acquisition system, performing a scan matching process on the SBET data and the ranging data to identify objects and/or object features in the defined space, performing a process to revise the SBET data so that the SBET data aligns with the identified objects and/or object features and storing the revised SBET data with the range data.

33 Claims, 10 Drawing Sheets

SYSTEMS AND METHODS FOR PROCESSING MAPPING AND MODELING DATA

REFERENCE TO RELATED APPLICATION

This application is based on and claims the benefit of U.S. Provisional Application Ser. No. 61/337,549, filed Feb. 5, 2010 entitled Systems and Methods for Processing Mapping and Modeling Data, the entire contents of which are herein incorporated by reference.

BACKGROUND

1. Technical Field

The present disclosure relates to mapping and modeling data and, more particularly, to systems and methods for processing mapping and modeling data.

2. Description of the Background Art

Maps enhance the value of positioning by effectively converting position information of natural and man-made objects, persons, vehicles and structures to location information. Outdoor mapping such as street mapping capability has been announced by companies Navteq and Tele-Atlas. These outdoor location services are GPS-based in that they acquire and use GPS signals to obtain precise position and location information for positioning and mapping. One example is discussed in U.S. Pat. No. 6,711,475. This patent, as well the other patents identified or described herein, are incorporated herein by reference.

Where GPS signals are not available or not dependable (such as indoors) attempts have been made to determine position or location. U.S. Pat. No. 5,959,575 describes the use of a plurality of ground transceivers which transmit pseudorandom signals to be used by a mobile GPS receiver indoors.

In mining operations where GPS signals are not available, U.S. Pat. No. 6,009,359 describes the use of an Inertial Navigation System (INS) to determine position, and obtaining image frames which are tiled together to get a picture of inside the mine. U.S. Pat. No. 6,349,249 describes a system for obtaining mine Tunnel Outline Plan views (TOPES) using an inertial measurement unit (IMU). U.S. Pat. No. 6,608,913 describes a system for obtaining point cloud data of the interior of a mine using an INS, to thereafter locate a position of a mining vehicle in the mine.

In indoor facilities such as buildings, U.S. Pat. No. 7,302,359 describes the use of an IMU and rangefinder to obtain a two-dimensional map of the building interior, such as wall and door locations. U.S. Pat. No. 6,917,893 describes another indoor mapping system for obtaining two-dimensional or three-dimensional data using an IMU, laser rangefinder and camera.

U.S. Patent Application Publication No. 2009/0262974 to Erik Lithopoulos (the Lithopoulos application) relates to a system and method for acquiring geospatial data information including a positioning device for determining the position of surface data points of a structure in three-dimensions in a region unable to receive adequate GPS signals. The Lithopoulos application is incorporated herein by reference and is considered as forming a part of the present disclosure. The system is capable of obtaining ranging, imaging and position data of a premises undergoing scanning. The system correlates the position and image data for the data points. Utilizing the stored data, three dimensional geographical coordinates of the surface data points may then be calculated and stored. Image data of the points from the image capture device may be draped over the surface data points to provide and store texture and color for those points. This process continues from point to point thereby forming a cloud (point cloud) of georeferenced positions data. Utilizing, the stored data, a processor can reconstruct an image of a mapped interior surface area of the premises. The Lithopoulos application thus provides a useful tool for mapping the interior environment of a structure such as a building.

The subject matter of the present application is complementary to the Lithopoulos application and is a useful tool for facilitating the generation of clear, non-blurry mapping images. Mapped digital images can sometimes by blurry because the accuracy of location determining systems capable of use in areas not accessible to GPS signals can be limited. For example, inertial and odometry systems have inherent errors in their location determining capabilities. This error in turn, effects locating of the three dimensional geographical coordinates of the surface data points, thus resulting in a "blur" when the point cloud is generated.

Sensor technologies that will not only operate indoors but will do so without relying on building infrastructure provide highly desirable advantages for public safety crews, such as firefighters, law enforcement including SWAT teams, and the military. The need for such indoor mapping has increased due to the ever increasing concern to protect the public from terrorist activity especially since terrorist attacks on public, non-military targets where citizens work and live. In addition to terrorist activity, hostage activity and shootings involving student campuses, schools, banks, government buildings, as well as criminal activity such as burglaries and other crimes against people and property have increased the need for such indoor mapping capability and the resulting creation of displayable information that provides a virtual travel through interior regions of a building structure.

What is needed is a system and method for three dimensional mapping of regions, especially those regions where GPS signal information is not available or is unreliable such as within a building structure, and for showing the location and boundaries of interior objects and structures, as well as characteristic image data such as color, reflectivity, brightness, texture, lighting, shading and other features of such structures, whereby such data may be processed and displayed to enable a virtual tour of the mapped region. In particular, the mobile system and method described herein are capable of generating indoor maps that are highly accurate and clear and can be produced quickly by simply walking through the interior areas of a building structure to obtain the data needed to create the maps without the use of support from any external infrastructure or the need to exit the indoor space for additional data collection. In addition, the subject matter of the application includes a system and method for providing such indoor location information based upon the operator's floor, room and last door walked through, which information can be provided by combining position information with an indoor building map. Moreover, a mobile mapping system and method is described by which high-rate, high-accuracy sensor, position and orientation data are used to geo-reference data from mobile platforms. A benefit of geo-referencing data from a mobile platform is increased productivity since large amounts of map data may be collected over a short period of time.

SUMMARY

This application describes tools (in the form of methodologies, apparatuses, and systems) for post processing interior range data. The tools may be embodied in one or more computer programs stored on a computer readable medium (e.g., a computer recording medium) or program storage device and/or transmitted in the form of a computer data signal in one or more segments via a computer network or other transmission medium.

A system and method for post-processing georeferenced mapping data includes providing positioning data indicating a position of a data acquisition system in a defined space at specific moments in time, providing ranging data indicating relative position of objects in the defined space with respect to the data acquisition system at the specific moments in time, performing a smoothing process on the positioning data to determine smoothed best estimate of trajectory (SBET) data for trajectory of the data acquisition system, performing a scan matching process on the SBET data and the ranging data to identify objects and/or object features in the defined space, performing a process to revise the SBET data so that the SBET data aligns with the identified objects and/or object features and storing the revised SBET data with the range data.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

SLAM (Simultaneous Localization and Mapping) is a general term used to describe a series of steps performed in real-time to determine the position of a robot in an environment while at the same time creating a map of the environment. A SLAM process generally consists of several parts, with the ultimate goal of the process to use the environment to update the position of the robot.

Figure 9:
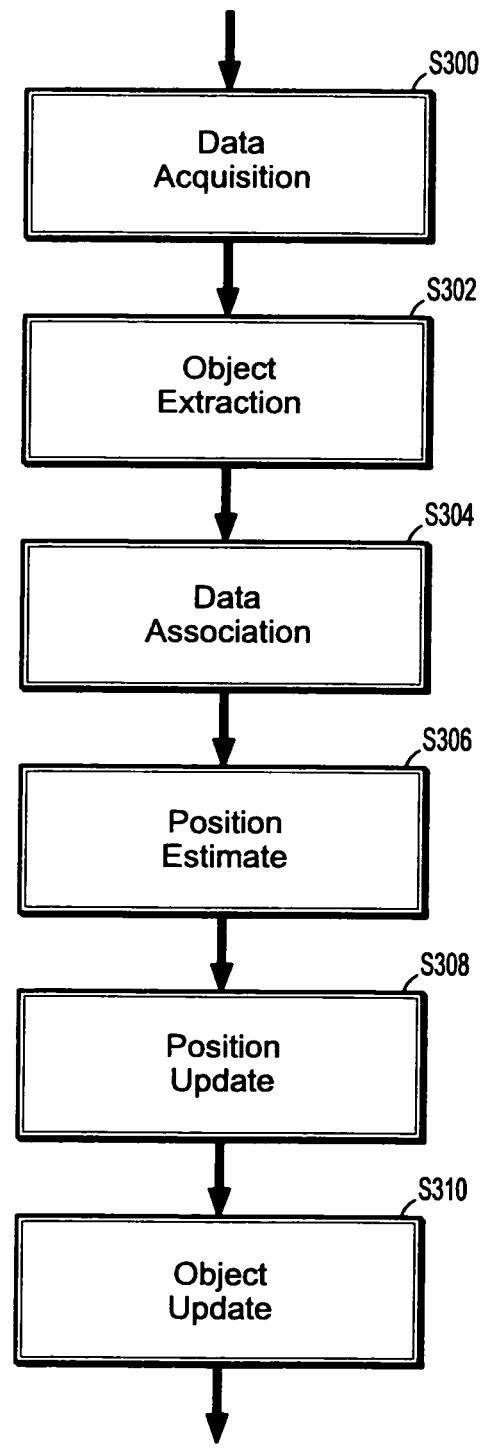
FIG. 9 shows an example of a SLAM process.

An example of a SLAM process is shown in FIG. 9 and includes data acquisition (Step S300), object extraction (Step S302), data association (Step S304), position estimation (Step S306), position update (Step S308) and object update (Step S310).

There are numerous methods that may be used to implement steps involved in the SLAM process described herein. The present disclosure will only mention a few with the understanding that other methods are available and new methods are constantly evolving in the field of robotics.

Data acquisition Step S300 is used to obtain real-time data about the environment and about the position of the robot itself within that environment. Various types of data may be acquired by the robot depending on its capabilities. For example, the robot may be equipped with sonar, laser and/or image based ranging systems for obtaining data about the robot's surroundings. In addition, if the robot is operating in an environment not accessible to GPS signals (e.g., indoors), the robot may be equipped with inertial guidance systems including, for example, accelerometers, gyros, etc. and/or odometry systems including sensors, shaft encoders, etc. to estimate the distance and direction traveled. Image based systems may even be used to provide an estimate of the distance and direction traveled.

Objects are features in the environment that can easily be re-observed and distinguished from other features in the environment. Object extraction Step S302 is used to extract information from the obtained data and attempt to identify objects in the environment.

One object extraction method is spike landmark (object) extraction which utilizes extrema to find objects. In the spike landmark extraction method, objects are identified by finding values in the range of a laser scan where two values differ by more than a certain amount. Another method is referred to as RANSAC (Random Sampling Consensus) which is used to extract lines from a laser scan. Yet another method is referred to as scan-matching where successive scans are matched. Scan-matching can be performed using laser range data from a laser scan or visual data from an image capture device such as a camera. CSIRO ICT Centre of Brisbane Australia is one source for state-of-the-art scan-matching software.

Data association Step S304 matches observed objects from different scans with each other. One approach is referred to as the nearest-neighbor approach where an object is associated with the nearest object in the database.

Position estimation Step S306 refers to a process of estimating the position of the robot from position (e.g., odometry and/or inertial) data and/or extracted object observations. An Extended Kalman Filter (EKF) is often used to perform this estimate.

Updating the current position estimate Step S308 can be readily performed by computing the current position from the previous position utilizing the odometry and/or inertial data.

Updating the estimated position Step S310 is performed by re-observing objects. For example, using the estimate of the current position, it is possible to estimate where the object and robot should be.

Accordingly, SLAM is used as a real-time solution for localizing a robot in an environment and for creating a map usable by the robot for traversing the environment.

According to embodiments of the present disclosure, clear and accurate images of an interior environment can be created by post-processing ranging, imaging and position data obtained, for example; by a method such as that disclosed in the Lithopoulos application utilizing certain aspects of SLAM. Although the present disclosure will be described by reference to Light Detection and Ranging (LIDAR) laser ranging systems and inertial location systems, it will be appreciated that other types of ranging and location systems, including those mentioned above, may be utilized in addition to or in their place.

Figure 1:
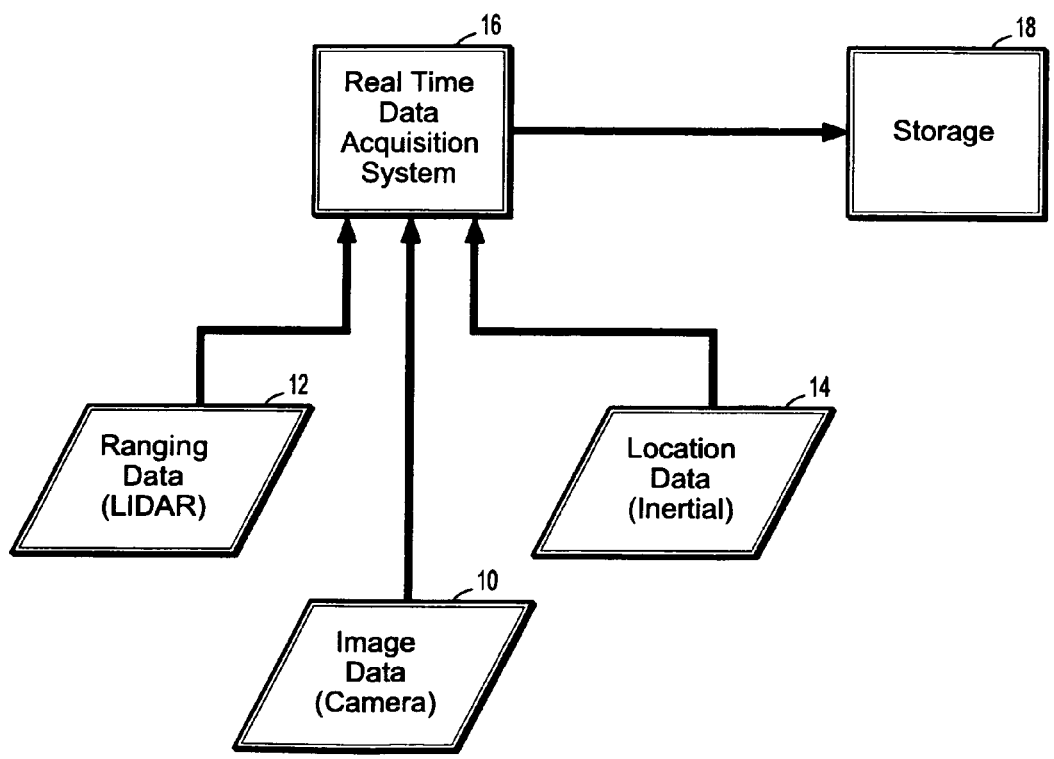
FIG. 1 shows a block diagram of a data acquisition system for acquiring information to be post processed.

FIG. 1 shows the various types of data that can be collected by a data acquisition system according to embodiments of the present disclosure. The collected data can include ranging data 12 (e.g., LIDAR), image data 10 (e.g., camera) and location data 14 (e.g., odometry and/or inertial). The data can be acquired in real time using an interior data acquisition system 16. The acquired data is correlated and stored in storage 18 by the data acquisition system 16. Storage 18 may include one or more storage devices and may or may not form a part of the data acquisition system 16. For example, data acquisition system 16 may include a system for transmitting the acquired data to a remote location where it can then be stored for later post processing.

An example of an interior data acquisition system 16 is disclosed in the Lithopoulos application and is described in more detail below. Data acquisition system 16 may be provided on any suitable type of platform for traversing an interior area and obtaining the data in question. For example, the data acquisition system 16 may be provided on a backpack or a wheeled vehicle or can be provided on a robotic vehicle capable of traversing the interior area by remote human and/or autonomous control.

Figure 2:
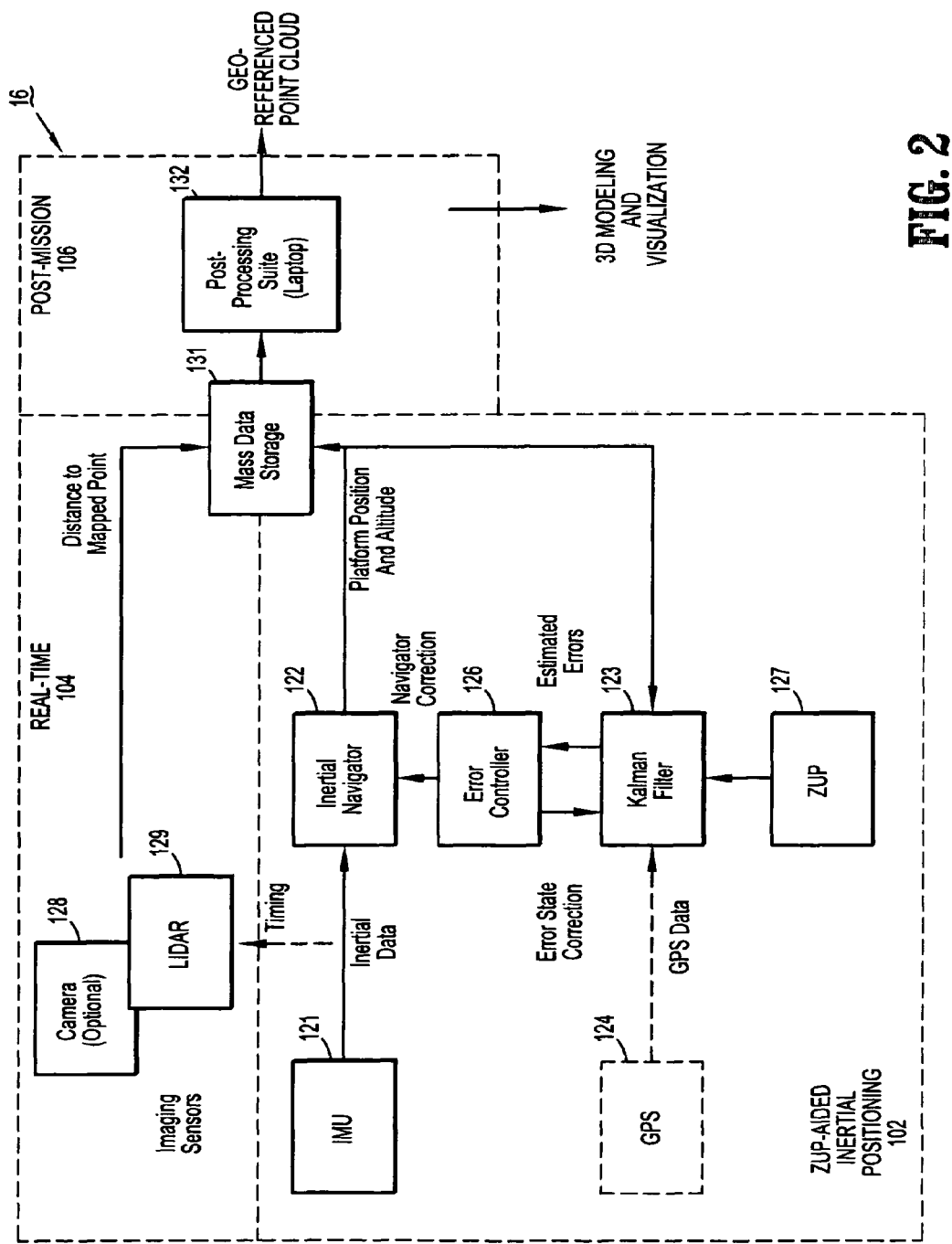
FIG. 2 shows a detailed block diagram of a system for acquiring information to be post processed.

A block diagram of a data acquisition system 16 is shown in FIG. 2. The system is divided into several sections including inertial positioning section 102, real-time imaging section 104 and post-mission processing section 106.

Inertial positioning section 102 includes an Inertial Measurement Unit (IMU) 121 functionally connected to an Inertial Navigator at block 122. IMU 121 is a zero velocity update (ZUP)-aided inertial IMU, as will be described in more detail below, and measures sensor position and orientation. Blocks containing error correction components described below present position correction information to the Inertial Navigator 122. The error correction components are used to increase accuracy since the accuracy of the IMU position measurements degrades with distance traveled.

IMU 121 represents a highly precise, navigation-grade IMU which may have various components, including one or more gyroscopes and one or more accelerometer sensors that provide incremental linear and angular motion measurements to the Inertial Navigator 122. The IMU 121 may be a high-performance, navigation-grade unit, using gyroscopes with 0.01 deg/hr performance or better, such as the Honeywell HG9900, HG2120 or micro IRS. The Inertial Navigator 122, using sensor error estimates provided by a Kalman filter 123, corrects these initial measurements and transforms them to estimates of the x, y, z position, and orientation data including pitch, roll and heading data at a selected navigation frame. When GPS signals are available, a GPS receiver 124, shown in dotted lines, provides GPS data to the Kalman Filter 123 for the initial alignment of the IMU. The alignment process based upon GPS position information may be static or dynamic. If static, the alignment process occurs at a fixed and known position with known coordinates. The alignment process may also be accomplished dynamically on a moving vehicle using GPS to aid in obtaining correct position information from the IMU 121.

For continued operation in an interior region of a building, subsequent navigation is generally performed in the complete absence of GPS. In such a case, when the GPS signal is lost, the IMU 121 takes over and acquires the position data. The Kalman filter 123 provides processed measurement information subject to errors to an error controller 126, which keeps track of the accumulated errors in estimated measurements over time. When the Kalman Filter's estimated measurement errors grow above a threshold, usually over a period of from 1 to 2 minutes, the system requests a zero velocity update (ZUP), indicated at block 127, from the operator through an audio notification. The sensor platform, either a backpack, cart or robot, is then made motionless for 10-15 sec to permit the Kalman filter 123 to perform error corrections for the then existing position of the sensor platform. The mapping operation is resumed after each roughly 15 second delay period. In this situation, the IMU can operate without any GPS aiding for hours, using only ZUP as an aid to correction of the IMU's sensor errors. In this way, the Inertial Navigator 122 obtains updated correct position information every few minutes, a technique that avoids the otherwise regular degradation in accuracy for IMU position measurements over time.

The real-time imaging section 104 may include several types of sensors. For example, according to an embodiment, imaging section 104 includes one or more geospatial data sensors such as LIDAR 129 and/or one or more cameras 128, by which geospatial data is collected. Cameras 128 may include one or more digital cameras for capturing image data such as color, brightness and other visual attributes from surface structures or objects being mapped inside the target building or structure. The LIDAR 129 measures how far and in what direction (pitch, roll and heading) the target structure or object being imaged is located from the sensor platform, to provide relative displacement information. The LIDAR sensor, a scanning laser, may be a SICK, Riegl or Velodyne sensor. In an embodiment, a single camera may be used without a LIDAR, in which case depth may be determined from sequential views of the same feature. The camera may be a Point Grey camera. In an embodiment comprising a stereoptic system, depth may be determined from a single view of a feature (or features). If a camera is used to determine depth or distance instead of a LIDAR, then the post-mission software may perform the function of range determination.

All data, including the LIDAR and image data, as well as the IMU incremental x, y, z position and pitch, roll and heading information are stored on a mass storage device 131. The data input to mass storage device 131 may be time-tagged with time provided by an internal clock in the system processor or computer and is stored in a mass storage device at block 131 such as a computer hard drive. The computer system may be an Applanix POS Computer System.

According to an embodiment of the present disclosure, the data can be retrieved post-mission through a post processing suite 132 which combines the ZUP-aided-inertial positioning system's positioning information and orientation measurements with the LIDAR's range measurements. Post-mission software is capable of performing several functions. One function is to combine pitch/roll/heading with the range measurements to build a three dimensional geo-referenced point cloud of the traversed space. Post-mission processing section 106 is capable of producing and outputting three dimensional modeling and visualization for use by others to view the completed indoor map. Utilizing aspects of the present disclosure, clear three dimensional modeling and visualization can be provided.

Figure 3:
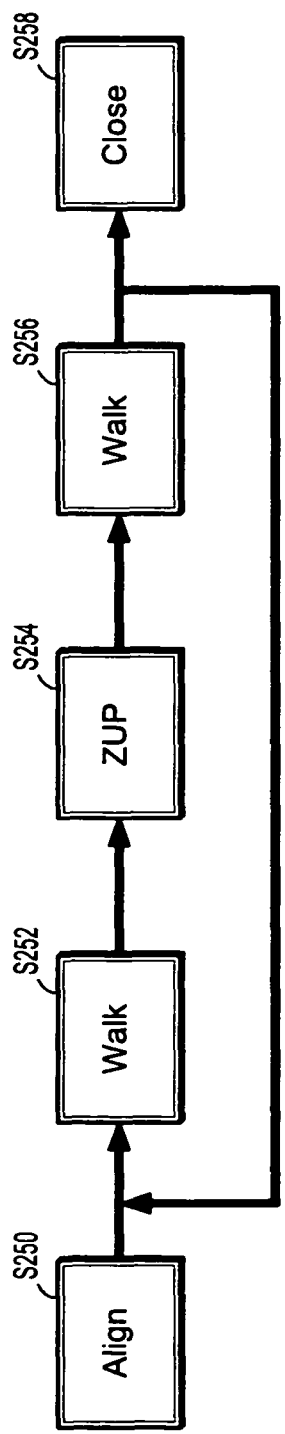
FIG. 3 is a flow chart of steps involved in acquiring data according to an embodiment of the present disclosure.

FIG. 3 depicts a flowchart of an embodiment in which the steps involved in acquiring mapping data are illustrated. The step Align S250 includes determining north and down directions either statically or dynamically. Statically means at a fixed position with known coordinates, typically on the ground using GPS, which may take about 10-20 minutes. Dynamically means on a vehicle or a person moving using GPS-aiding.

The next step Walk S252 involves any walking speed or movement of the data acquisition/collection apparatus through the premises being mapped. The apparatus has a LIDAR and digital camera to acquire depth and image data, as described above.

The next step ZUP S254 involves obtaining a zero-velocity update of position by, for example, by stopping movement of the data acquisition/collection apparatus every 1-2 minutes and remaining motionless for 10-15 seconds in order to permit correction of the measured position information. The step Walk S256 is then continued until the next ZUP S224 period. The steps of Walk and ZUP are repeated until mapping of the target region is complete S258.

Figure 4:
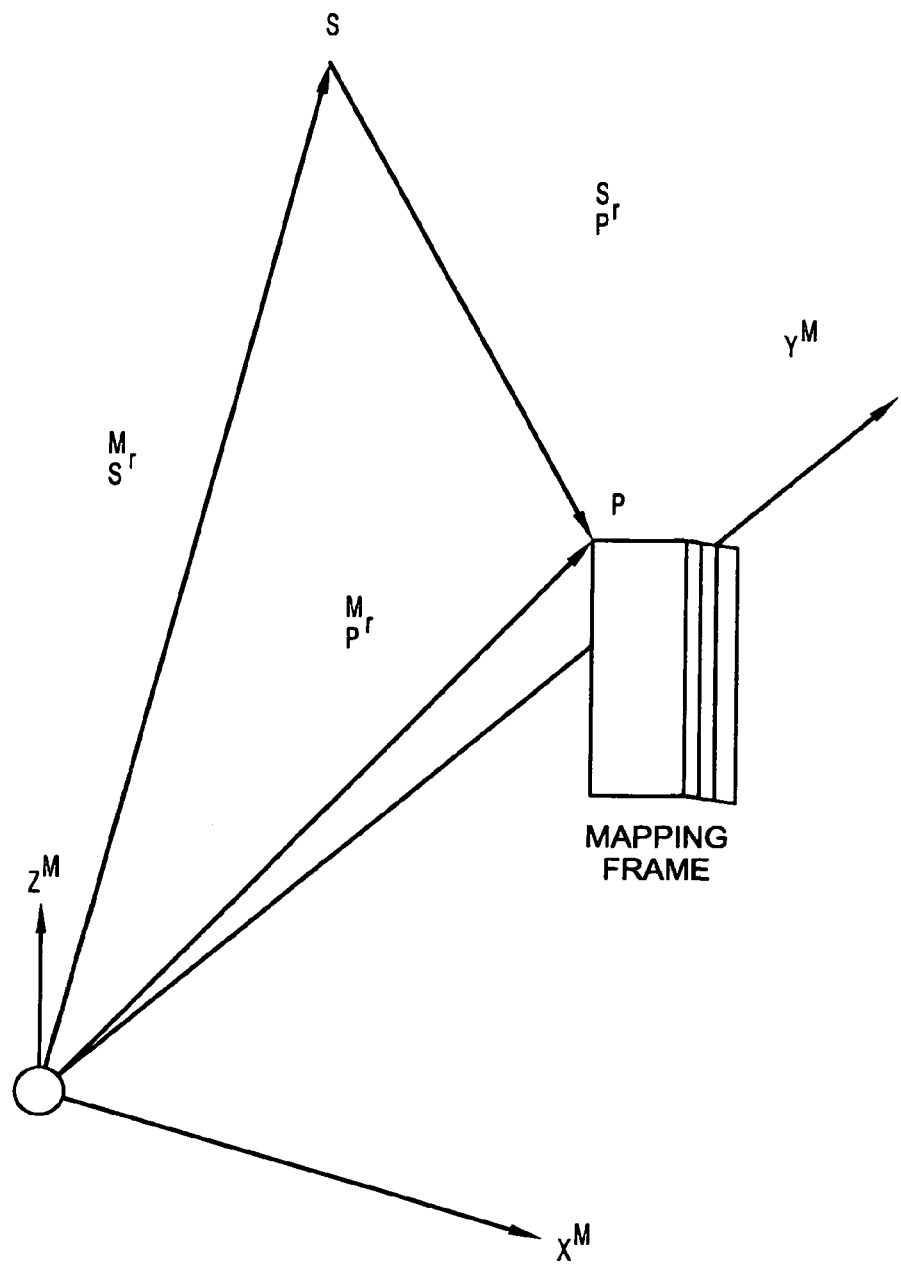
FIG. 4 is a vector diagram illustrating a georeferencing concept.
Figure 5A:
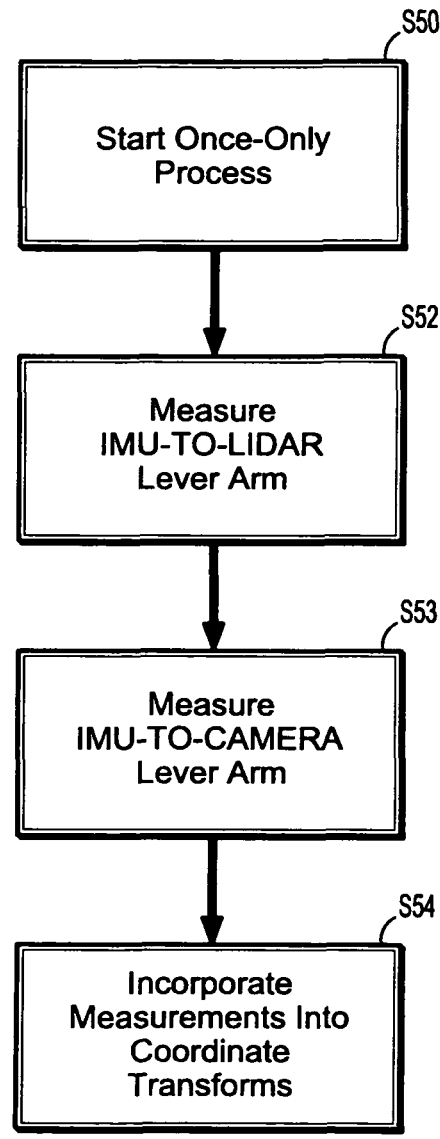
FIG. 5A shoes a one-time procedure to calibrate the distances and angles, the so called lever arms.
Figure 5B:
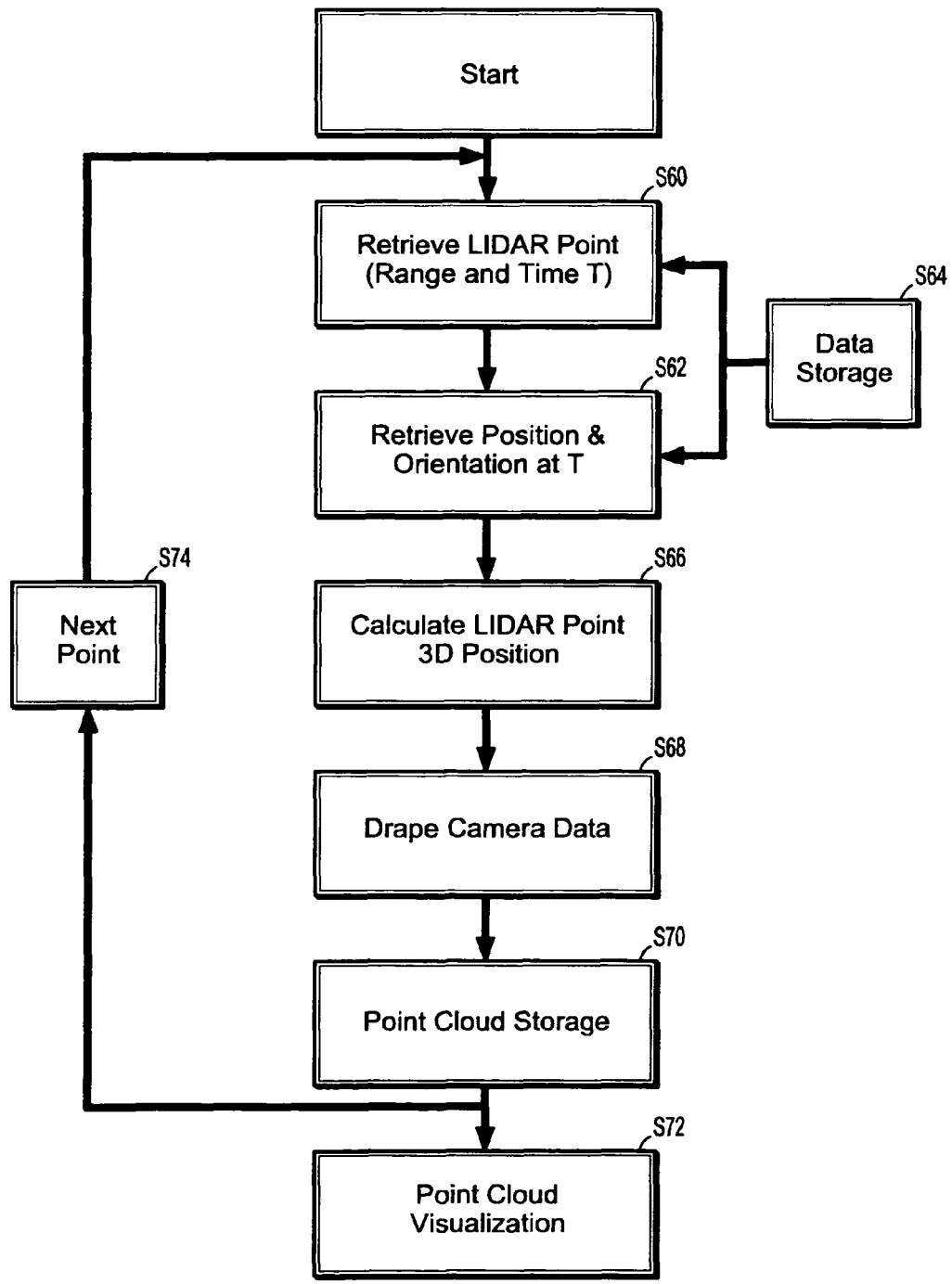
FIG. 5B illustrates steps to produce a map from the collected data.

With reference to FIGS. 4, 5A and 5B, there is depicted a georeferencing process or method for acquiring spatial mapping information, e.g., assigning mapping frame coordinates to a target point P on a structure to be mapped using measurements taken by a remote sensor. A general method consists of determining the positions of a plurality of surface data points P of a target structure, obtaining characteristic image data of the surface data points, storing information representing the positions of the surface data points of the target structure along with their characteristic image data, and correlating the position data and image data for the surface data points. The method may further include the step of recreating, for purposes of display, an image of the target structure using the positioning data and image data.

FIG. 4 is a vector diagram illustrating a method of deriving mapping frame coordinates for a target point P on a surface to be mapped based upon measurements made by a remote sensor platform S. The sensor platform S consists of the instruments described above. The vector $r_s^M$ represents the Cartesian coordinates of a sensor platform S relative to a fixed reference point M. The vector $r_p^s$ is the sensor pointing vector representing attitude data for the sensor platform S relative to the target point P, as well as the distance from the sensor platform S to the target point P. The vector $r_p^M$ is a vector representing the position of a mapped point P relative to the reference point M.

The first step in the process is to determine the vector $r_s^M$. In outdoor environments this can be accomplished by using GPS or a GPS-aided inertial system. In an indoor environment this can be accomplished by using a ZUP-aided IMU. The next step is to determine the vector $r_p^s$ by determining the polar coordinates of the sensor platform S (attitude angles: roll, pitch, heading) and the distance of the sensor platform S from the point P. The angles may be determined using gyroscopes and a ZUP-aided IMU. In an embodiment, the ZUP-aided IMU is a navigation-grade IMU. The distance from the position sensor to the point P may be determined using a laser scanning device such as the LIDAR described above, or by using a stereo camera pair and triangulating. A single camera may also be used for obtaining sequentially spaced images of the target point from which distance from the position sensor to the target point P may be derived. As indicated above, the camera also provides characteristic image data for each target point P on the surface to be mapped. The information available from the foregoing vectors enables the computation of the coordinates of the target point P.

FIGS. 5A and 5B illustrate an embodiment of an implementation of the georeferencing process. In FIG. 5A a one-time procedure of lever arm calibration is illustrated. The IMU, LIDAR and camera are firmly mounted on a rigid frame (e.g., the sensor platform). The distance between and relative orientations of the IMU, LIDAR and camera are thereby fixed and are measured (Steps S50-S53) and stored in the data store 131 (FIG. 2). This will permit the position and orientation measurements taking place at each point in time at the IMU to be correlated to the relative position and orientation of the camera and of the LIDAR at that time to aid in coordinate transforms (Step S54).

FIG. 5B outlines the steps to implement the georeferencing process as illustrated and described in connection with FIG. 4. LIDAR range measurement of each target surface point P and the time T it was obtained are retrieved from data storage along with the IMU position and orientation at time T (Steps S60-S62). The target surface point data are correlated with the IMU determination of position and orientation at the time T. Three dimensional geographical coordinates of each point P may then be calculated and stored (Step S66). Image data of the point P from a camera may be draped over the LIDAR data for point P to provide and store texture and color for that point (Step S68). This process is continued from point to point thereby forming a cloud of stored georeferenced positions in three dimensions for each mapped point P on the surface to be mapped (Steps S70-S74).

When the image data is correlated with the stored point position data, a data base exists by which the processor can reconstruct an image of a mapped interior surface area of the premises by selecting a vantage point, and selecting an azimuth and direction from that vantage point from which to display an image defined by the stored three dimensional positions for each mapped point on the surface area being mapped. These may be visualized using a suite such as the one from Object Raku. The processor will recreate or reconstruct an image representing the actual interior of the premises as though the viewer were actually inside the premises looking through an image capture device. The image seen can be continuously changed by selecting different vantage points as though the viewer was traveling through the premises, and the azimuth and direction may also be changed, either when the vantage point is constant or changing. The processor may also create stereo images, with an image provided separately to each eye of a viewer, to provide a three dimensional image. The images may be displayed on left and right displays worn as eyewear. Such an arrangement provides a virtual reality tour of the inside of the premises without actually being present inside the premises. The image or images viewed may be panned horizontally or vertically, or zoomed in or out.

In order to provide an even clearer sharper image, a processing procedure according to an embodiment of the present disclosure may be performed on the stored date.

Figure 6:
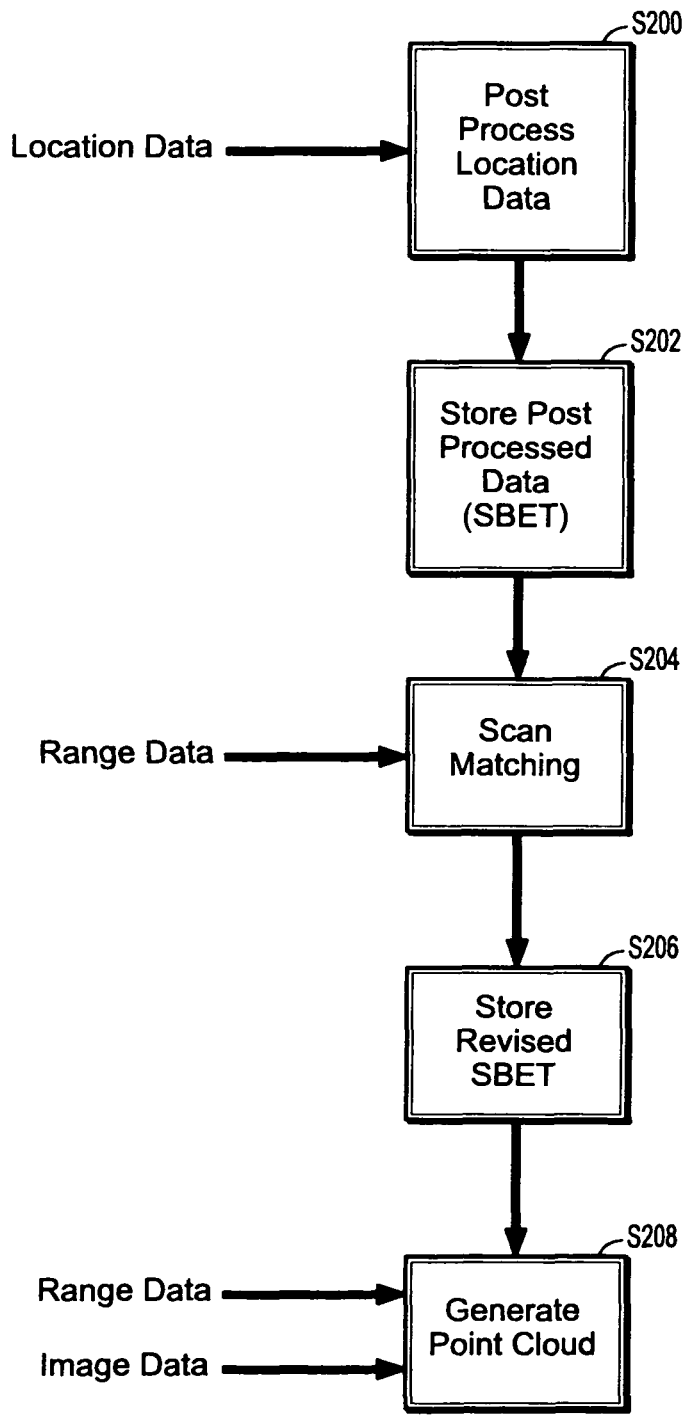
FIG. 6 shows a flow chart for describing a post processing procedure according to an embodiment of the present disclosure.

An overview of a process according to an embodiment of the present disclosure is shown in FIG. 6. According to this embodiment, post processing of the location data 14 (Step S200) can include smoothing of the location data which, in this case, consists of inertial data. Post processing of this data takes advantage of the ability to see backward and forward in the data, as well to run positioning processes in the forward and backward direction, which allows accurate smoothing of the data and produces smoothed best estimate of trajectory (SBET) data which is correlated to the other (image and ranging) data and stored (Step S202). Post processing (Step S200) can include smoothing, recomputations, statistical processing, etc. A scan matching technique (Step S204) is then performed on the ranging data (LIDAR sonar data) and utilizing the SBET is used to locate objects in the environment and to force the SBET data to align with the objects, thereby correcting or revising the trajectory. The revised SBET is then stored (Step S206). Utilizing the revised SBET, the image data 10 and the ranging data 12, point cloud generation is performed (Step S208) to generate an image of the interior environment that was scanned.

Although not shown, images resulting from appropriate pre and post processing producers have been produced. Images genenrated by utilizing post processing prosedures as disclosed herein are substantially more well defined than images generated without such post processing procedures.

Figure 7:
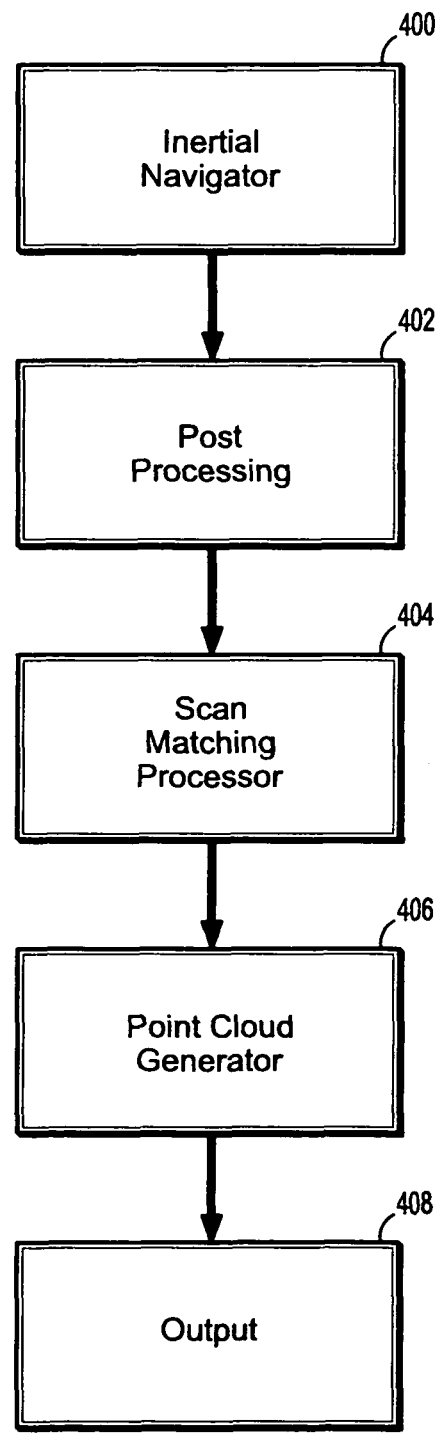
FIG. 7 is a block diagram for describing elements of a post processing processor according to an embodiment of the present disclosure.
Figure 8:
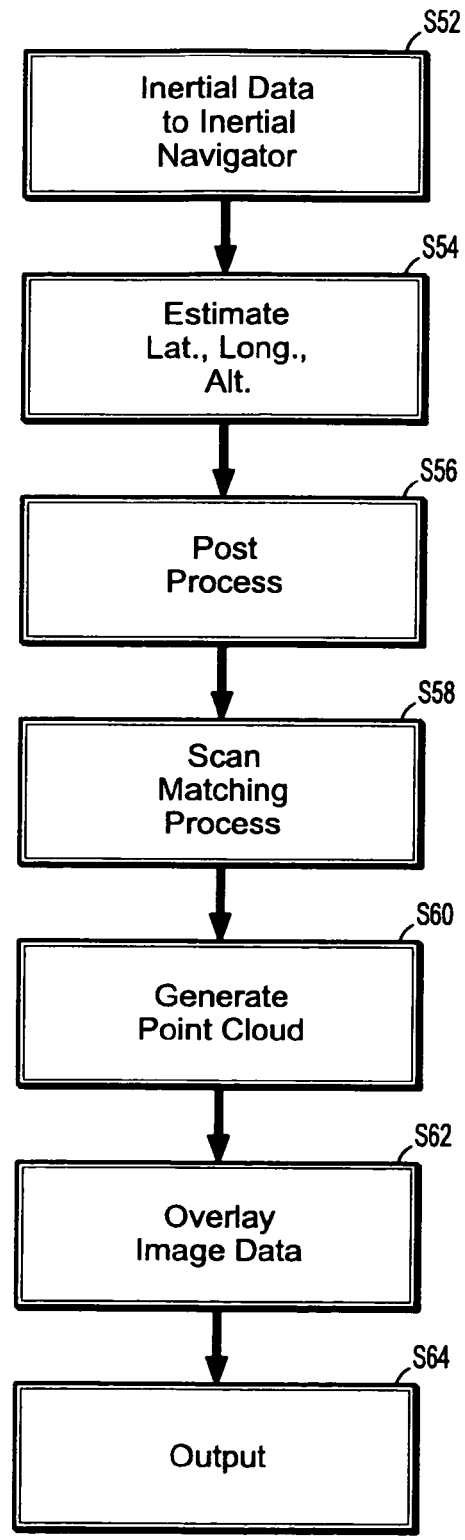
FIG. 8 is a flow chart for describing the post processing procedure.

The specific post processing that may be performed for implementing embodiments of the present disclosure will now be described in more detail by reference to FIGS. 7 and 8.

As noted above, the raw inertial data is geographical position data that was determined relative to at least one fixed reference point. This raw inertial data is fed into an inertial navigator 400 (Step S82) which is used to compute an estimated latitude, longitude and altitude at every instance of data (Step S84). These estimates may be based on a fixed reference point determined by a GPS receiver if the system is equipped with one and an initial reference point position can be located that has access to GPS signals. In the alternative, if a GPS signal and/or GPS receiver is not available, the estimates may be based on some other fixed reference point within the structure being scanned. The estimated data is then fed into the post processor 402 (Step S86) and, utilizing the ability to see forward and backward in the data, a smoothed best estimate of trajectory (SBET) is produced.

Various types of post process smoothers are available including, for example, fixed point smoothers, fixed lag smoothers and fixed interval smoothers. Specific examples of suitable types of smoothers include the Modified Bryson-Frazier Smoother (POSPac4), the Mayne-Fraser (or Two-Filter) Smoother (POSPacMMS branded as VWCN in TNG3 code) and the RTS (Rauch-Tung-Striebel) Smoother (POSPacMMS 5.4 (TNG4)). The purpose of the smoother is to remove random fluctuations in the raw trajectory data where appropriate and to provide a more accurate estimate of the actual trajectory taken.

The SBET and the range data (e.g., LIDAR laser data) are then fed into a scan matching processor 404 (Step S88) where one or more scan matching algorithms are utilized to perform statistical processes on the range data. Utilizing the SBET and the range data, position information of each of a plurality of surface data points can be more accurately determined. This allows objects and object features to be more accurately and readily identified.

For example, depending on the scan matching process used, objects identified may include walls, doors, door edges, furniture, furniture edges or other features of the environment that was mapped. According to an embodiment of the present disclosure, a scan matching process can be performed to identify linear features in the environment.

An example of a suitable type of scan matching process is provided by CSIRO ICT Centre, Brisbane Australia. Various types of suitable scan matching processes are described, for example in "Continuous 3D Scan-Matching with a Spinning 2D Laser" by M. Bosse and R. Slot and "Place Recognition using Keypoint Similarities in 2D Lidar Maps" by R. Zlot and M. Bosse, the contents of which are incorporated herein by reference and are considered to make up a portion of the present disclosure.

According to an embodiment of the present disclosure, the scan matching process also uses statistical processes to revise the SBET so that the trajectory aligns with the linear feature(s). For example, a statistical process may be performed on the range data to identify linear features formed where a wall meets a ceiling. The SBET can than be revised, where necessary, so that these known features remain linear. The revised SBET is then correlated and stored with the range and image data.

The revised SBET is then used by point cloud generator 406 to generate the point cloud (Step S90) and to overlay the image data (Step S92). The image map of the environment is then output (Step S94) via any suitable type or types of outputs 408 including, for example, displays, printers, etc.

The present disclosure thus uses a revised trajectory, the raw LIDAR data and, on the basis of common time, generates a point cloud which is the projection of the trajectory and LIDAR range on a range bearing supplied within the revised SBET. Accordingly, the coherence of the point cloud will be better than achievable using other methods. Coherence in this case is the ability to see objects clearly and for the objects not to be blurred by an inaccurate trajectory of the LIDAR sensor.

The scan matching process described herein applies statistical processes on the LIDAR laser range data to locate and identify objects in the environment and to determine a revised SBET. Of course, other types of scan matching techniques could be used. For example, as mentioned above, the image data can be used to determine range data. In that case, a scan matching process that applies statistical processes on the image data could be used to locate objects in the environment and to determine the revised SBET.

A salient feature of embodiments of the present disclosure is the use of the SBET as apriori input into the scan matching algorithm. Another salient feature of the present disclosure is the resulting "revised SBET" which will be of a quality and accuracy previously unattainable in such a mapping system configuration.

A yet further salient feature of the present disclosure is the application of the final (revised SBET) trajectory to camera (image) data which was simultaneously collected with the raw inertial data. In a GPS denied environment it would be impossible to have such an accurate trajectory to apply to the camera data without the inertially aided post processed scan matching techniques described herein.

It will be appreciated that depending on the data capture devices utilized, the images generated may be two dimensional or three dimensional.

The systems described herein can be implemented in digital electronic circuitry, or in computer hardware, firmware, software, or in combinations of them. The systems can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods associated the present disclosure can be performed by one or more programmable processors executing a computer program to perform functions by operating on input data and generating output. Methods can also be performed by, and apparatus of the present disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

Numerous additional modifications and variations of the present disclosure are possible in view of the above-teachings. It is therefore to be understood that the present disclosure may be practiced other than as specifically described herein. For example, elements and/or features of different illustrative embodiments may be combined with each other and/or substituted for each other within the scope of this disclosure.

What is claimed is:

1. A method for post-processing georeferenced mapping data comprising:

providing, from a storage, positioning data indicating a position of a data acquisition system in a defined space at specific moments in time;

providing, from the storage, ranging data indicating relative position of objects in the defined space with respect to the data acquisition system at the specific moments in time;

performing, by using a smoothing processor, a smoothing process on the positioning data to determine smoothed best estimate of trajectory (SBET) data for trajectory of the data acquisition system;

performing, by using a scan matching processor, a scan matching process on the SBET data and the ranging data to identify objects and/or object features in the defined space;

performing, by using a revising processor, a process to revise the SBET data so that the SBET data aligns with the identified objects and/or object features; and storing, the revised SBET data with the ranging data, into the storage.

2. The method of claim 1, further comprising generating a point cloud using the revised SBET data and the ranging data.

3. The method of claim 2, further comprising providing image data of the defined space at the specific moments in time.

4. The method of claim 3, further comprising overlaying the image data over the generated point cloud to create an image map of the defined space.

5. The method of claim 4, further comprising outputting the image map.

6. The method of claim 1, wherein the scan matching process identifies linear features in the defined space.

7. The method of claim 6, further comprising revising the SBET data so that the identified linear features remain linear.

8. The method of claim 1, wherein the objects and/or object features identified utilizing the scan matching process comprise at least one of walls, wall corners, doors, door edges, furniture and furniture edges.

9. The method of claim 1, wherein the ranging data comprises data collected by a light detection and ranging laser ranging system (LIDAR).

10. The method of claim 1, wherein the ranging data comprises data collected from at least one image taken by a camera.

11. The method of claim 1, wherein the positioning data comprises data collected by at least one of an odometry system and/or inertial measurement system.

12. A system for post-processing georeferenced mapping data comprising: a storage, storing positioning data indicating a position of a data acquisition system in a defined space at specific moments in time;

the storage, further storing ranging data indicating relative position of objects in the defined space with respect to the data acquisition system at the specific moments in time;

a smoothing processor performing, a smoothing process on the positioning data to determine smoothed best estimate of trajectory (SBET) data for trajectory of the data acquisition system;

a scan matching processor, performing a scan matching process on the SBET data and the ranging data to identify objects and/or object features in the defined space;

a revising processor, revising the SBET data so that the SBET data aligns with the identified objects and/or object features; and the storage, storing the revised SBET data with the ranging data.

13. The system of claim 12, further comprising a point cloud generator for generating a point cloud using the revised SBET data and the ranging data.

14. The system of claim 13, further comprising an image data provider for providing image data of the defined space at the specific moments in time.

15. The system if claim 14, further comprising an image map creator for overlaying the image data over the generated point cloud to create an image map of the defined space.

16. The system of claim 15, further comprising an output for outputting the image map.

17. The system of claim 12, wherein the scan matching processor identifies linear features in the defined space.

18. The system of claim 17, wherein the revising processor further revises the SBET data so that the identified linear features remain linear.

19. The system of claim 12, wherein the objects and/or object features identified utilizing the scan matching processor comprise at least one of walls, wall corners, doors, door edges, furniture and furniture edges.

20. The system of claim 12, wherein the ranging data comprises data collected by a light detection and ranging laser ranging system (LIDAR).

21. The system of claim 12, wherein the ranging data comprises data collected from at least one image taken by a camera.

22. The system of claim 12, wherein the positioning data comprises data collected by at least one of an odometry system and/or inertial measurement system.

23. A non-transitory computer-readable storage device embodying computer executable instructions for post-processing georeferenced mapping data, the computer executable instructions comprising:
  instructions to retrieve positioning data indicating a position of a data acquisition system in a defined space at specific moments in time;
  instructions to retrieve ranging data indicating relative position of objects in the defined space with respect to the data acquisition system at the specific moments in time;
  instructions to perform a smoothing process on the positioning data to determine smoothed best estimate of trajectory(SBET) data for trajectory of the data acquisition system;
  instructions to perform a scan matching process on the SBET data and the ranging data to identify objects and/or object features in the defined space;
  instructions to perform a process to revise the SBET data so that the SBET data aligns with the identified objects and/or object features; and
  instructions to store the revised SBET data with the ranging data.

24. The non-transitory computer-readable storage device of claim 23, further comprising instructions to generate a point cloud using the revised SBET data and the ranging data.

25. The non-transitory computer-readable storage device of claim 24, further comprising instructions to provide image data of the defined space at the specific moments in time.

26. The non-transitory computer-readable storage device of claim 25, further comprising instructions to overlay the image data over the generated point cloud to create an image map of the defined space.

27. The non-transitory computer-readable storage device of claim 26, further comprising instructions to output the image map.

28. The non-transitory computer-readable storage device of claim 23, wherein the code for instructions that perform the scan matching process identify linear features in the defined space.

29. The non-transitory computer-readable storage device of claim 28, further comprising instructions to revise the SBET data so that the identified linear features remain linear.

30. The non-transitory computer-readable storage device of claim 23, wherein the objects and/or object features identified utilizing the scan matching process comprise at least one of walls, wall corners, doors, door edges, furniture and furniture edges.

31. The non-transitory computer-readable storage device of claim 23, wherein the ranging data comprises data collected by a light detection and ranging laser ranging system (LIDAR).

32. The non-transitory computer-readable storage device of claim 23, wherein the ranging data comprises data collected from at least one image taken by a camera.

33. The non-transitory computer-readable storage device of claim 23, wherein the positioning data comprises data collected by at least one of an odometry system and inertial measurement system.

* * * * *